United States Patent [19]

Prasad

[11] Patent Number: 5,196,056
[45] Date of Patent: Mar. 23, 1993

[54] INK JET COMPOSITION WITH REDUCED BLEED

[75] Inventor: Keshava A. Prasad, Escondido, Calif.

[73] Assignee: Hewlett-Packard Company, Palo Alto, Calif.

[21] Appl. No.: 606,233

[22] Filed: Oct. 31, 1990

[51] Int. Cl.$^5$ ............................................. C09D 11/02
[52] U.S. Cl. .................. 106/15.05; 106/20D; 106/22R
[58] Field of Search ..................................... 106/22, 20

[56] References Cited

U.S. PATENT DOCUMENTS

| | | | |
|---|---|---|---|
| 4,170,482 | 10/1979 | Mansukhani | 106/20 |
| 4,184,881 | 1/1980 | Bradley | 106/22 |
| 4,299,630 | 11/1981 | Hwang | 106/22 |
| 4,383,859 | 5/1983 | Moore et al. | 106/22 |
| 4,388,115 | 6/1983 | Sugiyama et al. | 106/22 |
| 4,540,595 | 9/1985 | Acitelli et al. | 106/20 |
| 4,659,382 | 4/1987 | Kang | 106/22 |
| 4,664,708 | 5/1987 | Allen | 106/23 |
| 4,789,400 | 12/1988 | Solodar et al. | 106/22 |
| 5,017,644 | 5/1991 | Fuller et al. | 106/22 |

OTHER PUBLICATIONS

McCutcheon's Emulsifiers & Detergents, 1983 North American Edition, p. 237.
Grant & Hackh's Chemical Dictionary, 5th Edition, 1988 p. 112.

Primary Examiner—Mark L. Bell
Assistant Examiner—Helene Klemanski

[57] ABSTRACT

An ink jet composition useful in thermal, multi-color ink jet printers is provided that has the properties of reduced color mixing between adjacent drops of different colors when the drops are impacted onto paper during printing. The ink composition comprises an aqueous solution that consists essentially of a color dye and a bleed retarding agent. A particularly preferred bleed retarding agent is 2-(2-butoxyethoxy)ethanol.

2 Claims, No Drawings

INK JET COMPOSITION WITH REDUCED BLEED

FIELD OF THE INVENTION

The present invention generally relates to ink jet compositions for thermal ink jet printers, and more particularly relates to an ink jet composition with reduced color mixing of differently colored, adjacent drops when impacted onto paper during printing.

BACKGROUND OF THE INVENTION

Thermal ink jet printers can provide high speed, and relatively modestly priced printing. First generation ink jet printers were described in the May 1985 issue of the *Hewlett-Packard Journal*, Vol 36, No. 5. Second generation printers have increased resolution (from 96 to 180 dots per inch) and include color graphics and near letter quality, high-speed text. These printers were described in the August 1988 *Hewlett-Packard Journal*.

The general principals of operation for the pens of both printer generations are the same. Ink is channeled to chambers containing a thin-film resistor on the floor and a small orifice, or nozzle, on the chamber ceiling. The thin-film resistors are rapidly heated to temperatures exceeding 400° C. The ink directly over an excited resistor within the chamber is vaporized and a bubble is formed. As this vapor bubble grows, momentum is transferred to the ink above the bubble, which causes some ink to be propelled through the orifice and to impact onto paper. Each nozzle fires a drop of about 40-200 picoliters as a result of resistor heating in about 2-4 microseconds.

There are several methods being used to store and deliver ink to the resistor chambers. In one, ink is refilled to the resistor area from an ink reservoir (foam saturated with ink) by capillary action. Other methods use an ink bladder or gravity feed.

Ink in the reservoir forms a meniscus at the orifice on the ceiling when the apparatus is not being fired. In order for ink to flow from the reservoir to the nozzles (that is, the orifices), a priming process using pressure differentials is applied to the pen. There must be a continuous, air-free ink path between the reservoir and the meniscus in each nozzle or else deprinting can occur.

Each single color pen will have a number of nozzles that thus fire a plurality of drops, and the plurality of drops must be properly aligned when they impact on the paper in order to form the characters or graphic design desired. This system is highly dependent upon the ink composition for good performance, and a number of practical considerations are at play in preparing suitable ink formulations, particularly when performing multi-color printing or contemplating "plain paper" uses.

Among the problems encountered is "kogation," which is a coined term unique to thermal ink jet printing, and describes the decomposition of the dye resulting from heating to a high temperature by the hot resistor used to "fire" the bubbles of ink towards the paper substrate. Another problem with ink-jet compositions is evaporation of the carrier fluid so that components in the ink precipitate out and form a plug at the orifice. This can prevent proper firing of the ink and is commonly known as "crusting." To varying degrees of success, attempts have been made to reduce or eliminate the various problems that occur in preparing ink compositions for ink-jet printers.

One group of inks are aqueous based formulations with minor amounts of organic solvent (as cosolvent with water) used to adjust the rate of ink evaporation once on the paper. The solvent system itself is sometimes termed the "vehicle" and can be viewed primarily as a carrier for the dye. Where one desires to use plain paper (that is, paper useful for various purposes within a typical office), then it is typical to use primarily aqueous based inks. For example, plain paper is normally sized with starch designed for water based inks.

U.S. Pat. No. 4,853,037, issued Aug. 1, 1989, inventors Johnson et al., describes an ink composition for printing on plain paper using a thermal ink-jet printer. The ink composition comprises at least one member selected from the group consisting of ethylene glycol and diethylene glycol in an amount from about 5 to about 10 weight percent, a dye from about 1 to about 4 weight percent, and the balance water. Optional components include a biocide and a buffering agent.

U.S. Pat. No. 4,791,165, issued Dec. 13, 1988, inventors Bearess and Norton describes an ink composition for a thermal ink-jet printer comprising about 60 to 90 weight percent water, about 5 to 40 weight percent glycol, about 0.001 to about 10 weight percent polymer blend, and about 1 to about 7 weight percent dye. Suitable glycols are said to include ethylene glycol, propylene glycol, diethylene glycol, dipropylene glycol, triethylene glycol, tetraethylene glycol, 1-methoxy-2-propanol, dithioglycol, and ether derivatives. Examples of specific copolymers include polyvinyl pyrrolidone/polyvinyl acetate copolymers, typically in ratios of 60/40, 70/30.

U.S. Pat. No. 4,789,400, inventor Solodar, issued Dec. 6, 1988, discloses an aqueous based ink jet composition incorporating polymers having a molecular weight average of from about 1000 to 10,000 and said to impart superior drop formation. These compositions have a dye component and optionally a spreading substance in an amount from about 1 weight percent to about 10 weight percent. Specifically such spreading substances are said to be benzyl alcohol, N-butyldiethanolamine, 2-(2-butoxyethoxy)-ethanol, and 1-methyl-2-pyrrolidione. The purpose of these spreading substances is said to increase the spot size on the paper. Although these compositions may be desirable for ink jet printers that are energized by magneto restrictive piezo-electric means (such as disclosed in U.S. Pat. No. 3,846,141), they are not similarly useful in thermal ink jet printers where the ink is exposed to a hot resistor which tends to cause a high molecular weight species as is disclosed to decompose. Such degradation leads to the problems of kogation because carbon forms on the resistor surface and retards heat transfer.

U.S. Pat. No. 4,914,562, inventors Abe et al., issued Apr. 3, 1990, discloses ink compositions for wood-free paper that include between about 5 to about 20 wt. % wetting agent and an organic solvent, such as a primary alcohol, in an amount between about 3 and 30 wt. %. Non-ionic surface active agents and wetting agents are suggested for inclusion into the ink compositions with the non-ionic surfactants in amounts between about 5 and 50 wt. %, more preferably between 10 and 30 wt. %, and with wetting agent in an amount between 9 to 70 wt. %. However, such an ink composition tends to have substantial degradation of print quality due to the lessened amount of water replaced by surfactant and wetting agent, which increases capillarity of the ink.

Another problem in ink jet printing is the formation of bubbles, particularly bubbles in the resistor chambers or in the vicinity of the chamber's orifice. Bubbles can deprime the pen or cause small, deformed drops to be ejected. Conventional defoaming agents have been suggested for inclusion in the ink compositions. For example, U.S. Pat. No. 4,365,035, inventor Zabiak, issued Dec. 21, 1982, discloses inclusion of a defoamer for the purpose of reducing foaming during processing of a jet printing ink in preparation and use. Any conventional defoamer is said to be useful with amounts preferably being 0.002–0.1 wt. %. Specific defoaming agents exemplified are Dow-Corning's DB-31 silicone defoamer, with Foamkill 689 of Crucible Chemical Corporation and Bubble Breaker 748 marketed by Witco Chemical Company being also noted.

Efforts to develop improved ink compositions are continually in progress as ink-jet printers evolve. The present invention is particularly directed to thermal ink jet printers which print in several colors. These pose an additional problem of "bleed", that is, mixing of adjacent colors.

SUMMARY OF THE INVENTION

It is an object of the present invention to provide an ink jet composition useful in thermal, multi-color ink jet printers that has the property of reduced color mixing between adjacent drops of different colors when the drops are impacted onto paper during printing.

These and other objects and advantages of the present invention will become apparent upon reading these specification.

In one aspect of the present invention, an ink jet composition useful in thermal, multi-color ink jet printers comprises an aqueous solution that consists essentially of a colored dye and a bleed retarding agent. The bleed retarding agent is in an amount effective to reduce color mixing of a drop with an adjacent drop of another color when the drops are impacted onto paper during printing. The bleed retarding agent molecule has a polar portion and a non-polar portion. The polar portion of the bleed retarding agent preferably includes at least ethoxy moiety terminated by a hydroxyl. Particularly preferred bleed retarding agents are 2-(2-butoxyethoxy)ethanol and triethylene glycol butyl ether.

Preferred bleed retarding agents additionally have the property of greatly reducing the dry time as a result of penetration for drops once impacted onto paper. Particularly preferred embodiments of the ink jet composition, for example, need only about a sixty picoliter drop to create a dried dot of about 120μin diameter, which has a dry time of less than about 5 seconds.

DETAILED DESCRIPTION OF THE PREFERRED EMBODIMENTS

Compositions of the invention are generally useful in thermal ink jet printers. The ink jet compositions provide reduced color-to-color bleed when used in thermal ink jet printers with multi-colored capabilities. Whether or not the thermal printer with which these compositions are used has multi-colored capability, other advantages of the invention include improved dry time and larger dots at smaller drop volumes. As a point of reference, the prior art ink jet composition conventionally used in Hewlett-Packard DeskJet printers will be used occasionally hereinafter as a prior art reference in contrast to which will be exemplified properties of the inventive composition. The conventional ink composition being used in the DeskJet printers has typically had about 94.5 wt. % water and 5.5 wt. % diethylene glycol (DEG) as the cosolvent, which together comprise the vehicle for the dye. Thus, to this vehicle there will be added a dye and typically also minor amounts of buffer and bactericide.

The amount of dye added to the vehicle in prior compositions and the inventive composition tends to be a function of choice, and is largely dependant upon solubility of the dye in the vehicle. Typical amounts of dye are between about 1 wt. % to about 5 wt. % of the ink composition. In compositions of the invention, the dye is preferably colored rather than black, although any of the dyes used in inks for ink jet printers may be employed. Illustrative suitable dyes include Direct Red 9, Direct Red 227, Acid Yellow 23, Direct Yellow 86, Acid Blue 9, Direct Blue 86, and Acid Blue 185, which are anionic dyes that include sulfonate functional groups. Use of buffer is sometimes desirable to assist in maintaining the dye in solution.

Compositions of the invention essentially include a bleed retarding agent that has a polar portion and a non-polar portion. By "portion" is meant a part of the bleed retarding molecule that is substantially accessible or exposable to the aqueous solvent in either a hydrophilic or a hydrophobic relationship. Suitable bleed retarding agents can include branched molecules.

The non-polar portion of the bleed retarding agent includes an alkyl, alkenyl, or alkynyl group and preferably has between about 4 to about 14 carbon atoms and which can be branched or unbranched. The polar portion of the bleed retarding agent preferably includes at least one ethoxy moiety terminated by a hydroxyl. Particularly preferred bleed retarding agents also have humectant properties and is miscible with water in amounts used for the inventive compositions so as to serve as a cosolvent for the dye that will be dissolved in and thus carried by the vehicle.

Particularly preferred embodiments of the invention include bleed retarding agents having the following structures illustrated by Formulas 1 and 2.

where n is about 2 to about 13, and more preferably is 3, and where m is about 2 to about 10, and more preferably is 2.

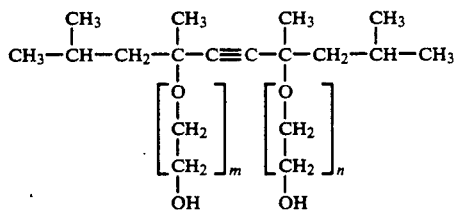

where m plus n is preferably about 10.

Thus, particularly preferred bleed retarding agents having the structure of Formula 1 are 2-(2-butoxyethoxy)ethanol (DGBE) and triethylene glycol butyl ether (TBH). A particularly preferred Formula 2 structure is commercially available from Air Products and Chemicals, Inc. (Allentown, Pa.) under the trade name "Surfynol 465."

Both DGBE and TBH exhibit humectant properties in the ink jet compositions of the invention. A particularly preferred ink jet composition with DGBE has between about 5 wt. % to about 20 wt. % DGBE and has a surface tension between about 45-30 dynes/cm while a particularly preferred composition with TBH has between 5 wt. % to about 15 wt. % TBH with a surface tension between about 45-35 dynes/cm. Mixtures can be used with a particularly preferred mixture being about 4 wt. % DGBE and about 4 wt. % TBH with a surface tension of about 40 dynes/cm and another mixture being from about 2 wt. % to about 4 wt. % Surfynol 465 with about 5 wt. % to about 8 wt. % DGBE. The Surfynol 465 bleed retarding agent in inventive compositions does not exhibit much, if any, humectant properties and thus the addition of a separate humectant (such as diethylene glycol) is advised, but with the total of humectant and bleed retarding agent preferable constituting not greater than about 10 wt. % of the aqueous solution.

Minor amounts (e.g., less than about 1% with respect to the aqueous solution) of one or more buffer, bactericide, and the like components may be present. For example, among the many bactericides known and useful are Nuosept 95 supplied by Nuodex, Inc., of Pisctaway, N.J. Buffer, if desired, preferably maintains compositions of the invention in a pH range of between about 6-8. The purpose of such an optional buffer is to maintain the pH of the ink composition in a region which is compatible with the materials that are being used in order to prevent corrosion, dissolution, and/or loss of adhesion in the materials used in the print head. Any buffering agent that is effective in small amounts, does not react with the dye, and yields the desired small pH range may be utilized. Examples of suitable basic buffering agents include sodium borate, sodium hydrogen phosphate, and sodium dihydrogen phosphate. Well known acidic buffering agents may also be employed. The buffering agent, if used, is typically in an amount of less than about 0.1 wt. % of the total ink concentration in order to reduce the possibility of crusting.

The balance of the ink compositions comprise water, most preferably deionized water. Compositions of the invention can be simply prepared by admixing the components and the purity of all components is that employed in normal, commercial practice.

Aspects of the invention will now be illustrated by the following examples, which are intended to be illustrative rather than limiting.

EXAMPLE 1

The significant improvement in color-to-color bleed provided by compositions of the invention was illustrated by several inventive embodiments (with varying amounts of DGBE), when compared with a prior art ink composition. The ink formulations were filled in a Stanley pen model no. 45R-370 architecture, and were fired from a DeskJet printer onto Gilbert bond paper.

Inventive embodiments of the invention were prepared with varying amounts of DGBE (between 4-20 wt. %), TBH (between 4-20 wt. %), and Surfynol 465 (between 1-3 wt. %), with all embodiments demonstrating reduction of color-to-color bleed. For example, one group of particularly preferred embodiments had DGBE present at 8 wt. %, water at 90-85 wt. %, dye from 1-6 wt. %, and bactericide at 0.1-0.5 wt. %, and these embodiments provided less than two dots of encroachment between two adjacent dots during high speed printing with no applied heat. The degree of color-to-color bleed was measured on an OSIRIS vision system from Carl Zeiss.

EXAMPLE 2

Compositions of the invention typically provided a significant improvement in dry time, even when preferred bleed retarding agent is present in relatively small amounts (such as 1 wt. % to 4 wt. %). Thus, in inventive compositions where DGBE was present at 1 wt. % (with water being 92.5-97.9 wt. %, dye in an amount of 1-6 wt. %, and 0.1-0.5 wt. % bactericide), the dry time improved with respect to a DeskJet ink from about 20 seconds to less than 5 seconds. When the DGBE was increased to 8 wt. %, then the dry time was about 20 milliseconds. Dry time was measured by a high speed camera system from Kodak.

EXAMPLE 3

Compositions of the invention provide substantially comparable dot spread, but from significantly smaller dot volumes. Using inventive compositions having DGBE at 8 wt. %, water between about 85.5-90.0 wt. %, dye at 1-6 wt. %, and bactericide at 0.1-0.5 wt. %, an ink jet pin with a drop volume of 60 picoliters produced a dot size of about 120μ (for a 300 dots per inch machine) on plain paper when measured on an OSIRIS vision system. By contrast, a conventional DeskJet ink delivered a 140 picoliter drop volume in producing the same dot size.

It is to be understood that while the invention has been described above in conjunction with preferred specific embodiments, the description and examples are intended to illustrate and not limit the scope of the invention, which is defined by the scope of the appended claims.

I claim:

1. An ink jet composition comprising:
   an aqueous solution consisting essentially of water in an amount of from about 85 wt. % to about 90 wt. % of the solution, a colored dye dissolved in the solution and in an amount of from about 1 wt. % to about 5 wt. %,
   2-(2-butoxyethoxy)ethanol in an amount of from about 1.5 wt. % to about 10 wt. %,
   a compound having the formula

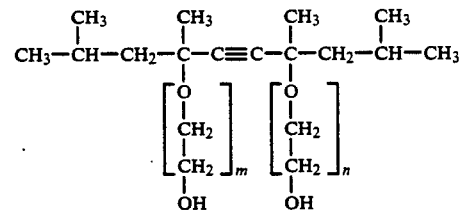

where m plus n is about 10, said compound being in an amount of from about 1 wt. % to about 3 wt. %, and
   optionally, one or more of a bactericide and a buffer.

2. The ink jet composition as defined in claim 1 wherein the composition has a pH from about 6 to about 8.